Dec. 3, 1940.   G. D. HARRISON   2,223,684
APPARATUS FOR MEASURING AND/OR DELIVERING FLUIDS
Filed May 19, 1939   2 Sheets-Sheet 1
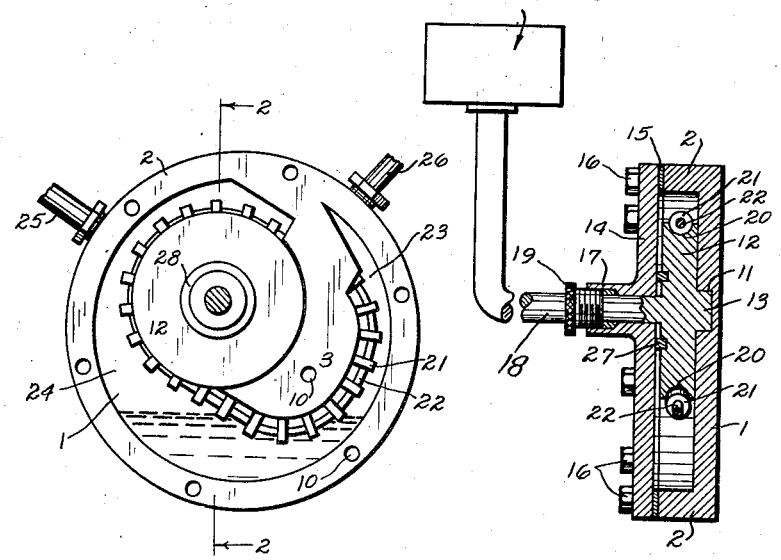
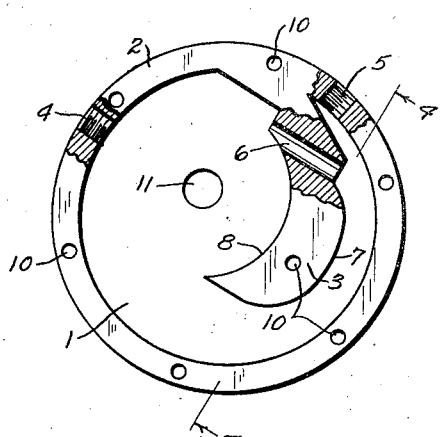
Inventor:
George D. Harrison
By Whitehead & Vogl
Per Carl Whitehead
Attorneys Patented Dec. 3, 1940

2,223,684

UNITED STATES PATENT OFFICE 2,223,684

APPARATUS FOR MEASURING AND/OR DELIVERING FLUIDS

George D. Harrison, Denver, Colo.

Application May 19, 1939, Serial No. 274,539

8 Claims. (Cl. 103—73)

This invention relates to apparatus for measuring or for regulating the flow of or for pumping fluids. Specific examples are, measuring the flow of gasoline to the carburetor of a combustion engine, regulating the flow of reagents to a fluid, pumping any fluid. The foregoing are simply examples of many uses to which the apparatus may be put.

Objects of the present invention are:

(a) To provide a single apparatus which may be used for measuring the flow of fluid or for regulating the flow of fluid or for pumping fluid, or for combinations of these functions;

(b) To provide a fluid-flow measuring or regulating apparatus of extreme simplicity, while maintaining accuracy;

(c) To provide an apparatus of said class having a large capacity and a relatively small size;

(d) To provide an apparatus of the class described in which there will be a minimum of moving or wearing parts, and in which a small amount of wear will not affect accuracy;

(e) To provide an apparatus of the class described, the accuracy or operation of which will be unaffected by shaking, jolting or vibration, or by ordinary changes in position;

(f) To provide an apparatus of the class described which shall be of extreme economy and simplicity of construction, combined with durability and accuracy in operation;

(g) To provide an apparatus of the class described which shall operate without valves and without reciprocating parts.

With the foregoing and other objects in view, all of which will more fully hereinafter appear, the invention comprises certain novel constructions, arrangements and combinations of parts, as hereinafter fully described and as defined in the appended claims, a preferred embodiment being illustrated in the accompanying drawings, in which Fig. 1 is an elevation view of the apparatus without cover plate or gasket.

Fig. 2 is a section on line 2—2 of Fig. 1.

Fig. 3 is a view the same as Fig. 1, but showing only the housing, certain parts being broken away and shown in section.

Fig. 4 is a section on line 4—4 of Fig. 3.

Figure 5:
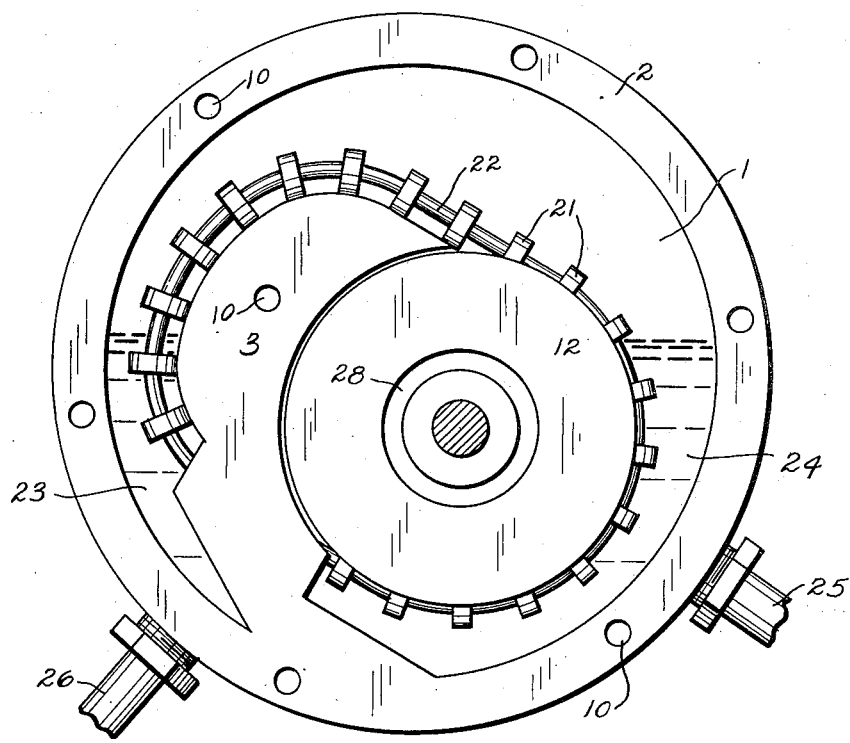
Fig. 5 is a view the same as Fig. 1 except that the apparatus is reversed, using an air seal at the top instead of a heavy liquid seal at the bottom, as in Fig. 1.

The apparatus comprises a housing generally illustrated in Figs. 3 and 4, having a back or base 1, an annular rim 2, and an internal member 3 projecting from the back 1 equidistant with the rim 2. The rim is provided with suitable intake orifice 4 and outlet orifice 5, and the member 3 is provided with a bore 6, from which bore to its lower end the member 3 is generally curved as illustrated, the outer surface thereof, indicated at 7, being suitably curved to form a guide for the chain hereinafter described, and the inner surface, indicated at 8, being suitably curved to accommodate the pulley hereinafter described. Seats or other suitable means 10 are provided in the rim, and preferably also in the member 3, to receive bolts or other fastening means for the cover plate hereinafter described. The back or base is provided with a recess 11 to furnish a bearing for the pulley hereinafter described.

Within the housing there is mounted a pulley 12 having a boss 13 adapted to freely, rotatively seat in the recess 11.

The housing is provided with a cover plate 14, a suitable gasket 15 being provided between the cover on the one side and rim and member 3 on the other. The cover 14 is affixed to the housing by suitable means, as cap-screws 16.

The cover 14 is provided with a boss 17, shaft 18, affixed to the pulley in concentric alignment with boss 13, being journaled in the cover 14, and the boss 17 being interiorly threaded to receive a packing nut 19.

The periphery of the pulley 12 is grooved as at 20, and the parts are so proportioned and positioned that the bore 6 will form a tangential extension of the groove 20.

Passing through the bore 6, seated in the groove 20 and encircling the face 7 of member 3, there is provided a chain made of materials suitable for resisting the action of gasoline or other liquid to be delivered through or used in the apparatus, neoprene rubber being one material suitable for the purpose. This chain consists of a plurality of discs 21 of peripheral shape and size to produce a liquid-tight, sliding fit within the bore 6, equally spaced along and carried by the cord 22.

The lower portion of the interior of the housing, in the embodiments illustrated in Figs. 1 to 4, is filled with a suitable heavy liquid, such as mercury, to a point above the lower extremity of member 3, and indicated by a series of broken lines of varied weights at Fig. 1, whereby to form a seal between the space within the housing on one side of the member 3, which space is designated as 23, and the space within the housing on the opposite side of the member 3, which space is designated as 24.

An intake tube 25, from any suitable source of liquid supply, is connected with the intake orifice 4, and a suitable outlet tube 26 is connected to the outlet orifice 5 and leads to any desired apparatus, as for example, to the carburetor of an internal combustion motor.

For better sealing of the apparatus against leak around shaft 18, there is provided a packing ring 27 of suitable material, set in groove 28 in the side of pulley 12 and adapted to seal the space between the pulley and the inner face of the cover as illustrated at Fig. 2.

The shaft 18 may be suitably connected to any suitable indicating mechanism, not shown, when the apparatus is to be used as a meter, and likewise shaft 18 may be connected with any suitable operating mechanism, not shown, when the apparatus is to be used to regulate fluid passage or as a pump.

It will be understood that in many cases, as for example, in measuring the flow of gasoline to the carburetor of an engine, it is desirable to have the freest possible movement of the parts of the meter consistent with accuracy, which involves fluid-tight construction. Therefore it is desirable to reduce to a minimum the number of parts which have to meet this requirement, and this is one of the material advantages of the present invention, for it will be noted that aside from the boss 13, shaft 18, packing nut 19, and packing ring 27, all of which may be made to meet the above requirement by standard practice, the only wearing parts are the discs 21, the peripheries of which have a slight frictional contact with the walls of bore 6.

The operation of the apparatus will first be described in terms of its use as a fuel meter in conjunction with an internal combustion motor.

When installed in the gas line leading to the carburetor of an internal combustion engine, the gasoline enters through intake 25 and orifice 4, filling the space 24, and as soon as comparatively small pressure has been established in said space 24, such pressure, seeking an outlet through bore 6, will carry the discs through the bore, causing the chain to rotate pulley 12 and turn shaft 18. As the gasoline passes through bore 6 it fills the space 23 and thereafter passes out through orifice 5 and outlet 26 to the carburetor. Shaft 18, being connected by any suitable means to a suitable indicating mechanism, constructed and adjusted in accordance with standard practice, will indicate in or upon said mechanism the quantity of gasoline passing through the apparatus from time to time.

It will be obvious that during operation above described the chain will hang practically loose from its point of exit from bore 6 until it again contacts the pulley 12, whereby friction between the chain and the surface 7 of member 3 will be reduced to a minimum, and there will be substantially no friction to overcome except the friction of the discs 21 in the bore 6 and the friction of the bearings of and packing members associated with pulley 12 and shaft 18, so that a relatively small pressure of gasoline will be sufficient to operate the apparatus. It will also be obvious that the arrangement of bore 6 tangentially to the groove 20 causes the chain to enter the bore in direct alignment therewith, and thereby eliminates any friction that would be incident to an angular entrance of the chain into the bore.

The application of the apparatus to the measuring of the flow of other fluids under other conditions will be obvious to those skilled in the art.

To operate the apparatus most effectively for delivering a regulated flow of fluid as, for example, continuously delivering a regulated quantity of reagent in a flotation process, the line of flow is preferably reversed, the reagent being received through pipe 26 and orifice 5, filling the space 23 and being drawn through the bore 6 by the chain which, in this case, is actuated by the pulley 12, which in turn is rotated by a suitable mechanism, not shown, but operatively connected with shaft 18. Such mechanism may be of various types suitable for a timed or regulated revolution of the shaft 18.

For use as a pump the apparatus will be operated in substantially the same manner as lastabove described for giving a regulated flow of a reagent, but when used simply as a pump, the timing or similar regulation of the mechanism employed to rotate the shaft 18 will not be material.

As above indicated, the apparatus may be used in reversed position as illustrated at Fig. 5, the operations being the same as hereinabove described except that when used in this position it is obvious that the fluid forming the seal must be lighter, instead of heavier, than the fluid which is being measured, regulated or pumped. Accordingly, instead of a heavy liquid such as mercury, I use, in this case a light fluid such as compressed air. In Fig. 1 the heavier fluid, such as mercury, is indicated by a series of broken lines of varied weights. In Fig. 5 the gasoline or other fluid being measured, regulated or pumped, being the heavier fluid, is indicated by a similar series of broken lines.

In the embodiment illustrated in Fig. 5 the friction of the chain on member 3 will be slightly more than in the other embodiment but not sufficient to prevent accurate operation.

I have illustrated and described the pulley 12 as a single means for both guiding the chain into the bore and forming a portion of the means connecting the chain with an exterior mechanism, but it will be understood that any other means may be employed for guiding the chain into the bore and that various other means may be employed for operatively connecting the chain and mechanism exterior of the housing.

I have hereinabove mentioned certain specific uses of the apparatus, but it will be obvious to those skilled in the art that the apparatus may be employed, operating upon the same principle as hereinabove disclosed, for a large variety of uses, and I do not wish to be confined to the uses specifically mentioned or even to those generally referred to.

I have hereinabove described and in the drawing have illustrated many details of construction, but modifications thereof and equivalents therefor will be obvious to those skilled in the art, and I do not wish to be confined to any such details.

I claim:

1. Apparatus of the class described comprising a housing having inlet and outlet for fluid, a partition between the inlet and outlet and partially dividing the interior of the housing, a fluid seal completing said division, a bore through said partition, an endless chain of members each of which has a sliding-fluid-tight fit in said bore, said chain being positioned to move in one direction through said bore, coincidently returning through said fluid seal.

2. Apparatus of the class described comprising a housing having an inlet and an outlet for fluid, a partition between the inlet and outlet partially dividing the interior of the housing, a fluid seal completing said division, a bore through said partition, an endless chain of members each of which has a sliding-fluid-tight fit in said bore, said chain being positioned to move in one direction through said bore, coincidently returning through said fluid seal, and a pulley rotatably mounted in one division of said housing and having a peripheral seat for said chain.

3. Apparatus of the class described comprising a housing having an inlet and an outlet for fluid, a partition between the inlet and outlet partially dividing the interior of the housing, a fluid seal completing said division, a bore through said partition, an endless chain of members each of which has a sliding-fluid-tight fit in said bore, said chain being positioned to move in one direction through said bore, coincidently returning through said fluid seal, a pulley rotatably mounted in one division of said housing and having a peripheral seat for said chain, and means connected with the pulley and projecting through the housing and adapted for operative connection with a mechanism exterior of the housing.

4. Apparatus of the class described comprising a housing having an inlet and an outlet for fluid, a partition between the inlet and outlet partially dividing the interior of the housing, a fluid seal completing said division, a bore through said partition, an endless chain of members each of which has a sliding-fluid-tight fit in said bore, said chain being positioned to move in one direction through said bore, coincidently returning through said fluid seal, and a pulley rotatably mounted in one division of said housing and having a peripheral seat for said chain, said bore being substantially a tangent of said seat.

5. Apparatus of the class described comprising a housing having an inlet and an outlet for fluid, a partition between the inlet and outlet partially dividing the interior of the housing, a fluid seal completing said division, a bore through said partition, an endless chain of members each of which has a sliding-fluid-tight fit in said bore, said chain being positioned to move in one direction through said bore, coincidently returning through said fluid seal, and a pulley rotatably mounted in one division of said housing and having a peripheral seat for said chain, said pulley being partially nested in said partition whereby to position said bore tangentially of said seat.

6. Apparatus of the class described comprising a housing having an inlet and an outlet for fluid, a partition between the inlet and outlet partially dividing the interior of the housing, a fluid seal completing said division, a bore through said partition, an endless chain of members each of which has a sliding-fluid-tight fit in said bore, said chain being positioned to move in one direction through said bore, coincidently returning through said fluid seal, and a pulley rotatably mounted in one division of said housing and having a peripheral seat for said chain, said pulley being partially nested in said partition whereby to position said bore tangentially of said seat, the opposite side of said partition forming a curved guide for the chain.

7. Apparatus of the class described comprising a housing having an inlet and an outlet for fluid, a partition between the inlet and outlet partially dividing the interior of the housing, a fluid seal completing said division, a bore through said partition, an endless chain of members each of which has a sliding-fluid-tight fit in said bore, said chain being positioned to move in one direction through said bore coincidently returning through said fluid seal, and means to align the chain with the bore prior to its entrance into the bore.

8. Apparatus of the class described comprising a housing having an inlet and an outlet for fluid, a partition between the inlet and outlet partially dividing the interior of the housing, a fluid seal completing said division, a bore through said partition, an endless chain of members each of which has a sliding-fluid-tight fit in said bore, said chain being positioned to move in one direction through said bore coincidently returning through said fluid seal, and means actuated by the chain and operatively projecting beyond the housing.

GEORGE D. HARRISON.